United States Patent
Okajima et al.

(10) Patent No.: US 6,819,661 B2
(45) Date of Patent: *Nov. 16, 2004

(54) METHOD AND APPARATUS OF A MOBILE COMMUNICATION SYSTEM WHICH REDUCES POWER CONSUMPTION BY OBSERVING ONLY THE STARTING SLOT ON A TDMA RADIO CHANNEL

(75) Inventors: Ichiro Okajima, Yokohama (JP);
Akihiro Maebara, Yokohama (JP);
Atsushi Murase, Yokosuka (JP);
Katsumi Kobayashi, Yokohama (JP);
Tadao Takami, Yokosuka (JP)

(73) Assignee: NTT DoCoMo, Inc., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,240
(22) PCT Filed: Mar. 12, 1997
(86) PCT No.: PCT/JP97/00777
§ 371 (c)(1),
(2), (4) Date: Jun. 10, 1997
(87) PCT Pub. No.: WO97/34385
PCT Pub. Date: Sep. 18, 1997

(65) Prior Publication Data
US 2002/0044543 A1 Apr. 18, 2002

(30) Foreign Application Priority Data
Mar. 15, 1996 (JP) .............................................. 8-59469

(51) Int. Cl.⁷ .............................................. H04B 7/212

(52) U.S. Cl. ....................... 370/347; 370/337; 370/336; 370/329; 370/342

(58) Field of Search ................................. 370/337, 336, 370/329, 347, 342, 343, 458, 468, 348, 349, 311, 437

(56) References Cited

U.S. PATENT DOCUMENTS

| | | | |
|---|---|---|---|
| 4,519,068 A | * | 5/1985 | Krebs et al. ................ 370/329 |
| 5,392,287 A | | 3/1992 | Tiedemann, Jr. et al. |

(List continued on next page.)

FOREIGN PATENT DOCUMENTS

| | | |
|---|---|---|
| CA | 2073674 | 5/1992 |
| EP | 0 522 631 A2 | 1/1993 |

(List continued on next page.)

*Primary Examiner*—Kwang Bin Yao
*Assistant Examiner*—Keith M. George
(74) *Attorney, Agent, or Firm*—Brinks Hofer Gilson & Lione (57) ABSTRACT

Base station generates a mobile station identifier which indicates a mobile station that a data signal is addressed thereto, and a head slot having a data signal when there is a data signal that has a length to be able to transmitted using one slot of a TDMA radio channel. When there is a data signal that has a length to be not able to transmitted using one slot, base station generates a head slot and continuous slots which contain at least a part of data signal. Base station transmits the head slot by using the starting slot which located at predetermined position every mobile station on the TDMA radio channel, and transmits the continuous slots by using slots which follow the starting slot. Mobile station receives the starting slot, and stops reception if the starting slot is not the head slot. If the starting slot is the head slot, the mobile station judges the mobile station identifier. Furthermore, if the mobile station identifier indicates other mobile station, the mobile station stops reception, on the other hand, if the mobile station identifier indicates itself, the mobile station receives the continuous slot.

26 Claims, 10 Drawing Sheets

U.S. PATENT DOCUMENTS

| | | | |
|---|---|---|---|
| 5,241,542 A | * 8/1993 | Natarajan et al. | 370/311 |
| 5,299,198 A | * 3/1994 | Kay et al. | 370/347 |
| 5,511,110 A | * 4/1996 | Drucker | 455/458 |
| 5,625,629 A | * 4/1997 | Wenk | 370/347 |
| 5,642,355 A | * 6/1997 | Smith | 370/337 |
| 5,642,356 A | * 6/1997 | Wenk | 370/337 |
| 5,644,576 A | * 7/1997 | Bauchot et al. | 370/437 |
| 5,689,503 A | * 11/1997 | Wada et al. | 370/337 |
| 5,717,686 A | * 2/1998 | Schiavoni | 370/321 |
| 5,729,541 A | * 3/1998 | Hamalainen et al. | 370/337 |
| 5,742,909 A | * 4/1998 | Uchida et al. | 370/311 |
| 5,850,593 A | * 12/1998 | Uratani | 455/11.1 |
| 5,886,989 A | * 3/1999 | Evans et al. | 370/347 |
| 5,930,706 A | * 7/1999 | Raith | 455/422 |

FOREIGN PATENT DOCUMENTS

| | | |
|---|---|---|
| EP | 0 536 099 A1 | 4/1993 |
| EP | 0 629 095 A2 | 12/1994 |
| EP | 0 731571 A | 11/1996 |
| JP | 64-007742 A | 1/1989 |
| JP | 1-245728 A | 9/1989 |
| JP | 2-203632 | 8/1990 |
| JP | 5-087049 | 4/1993 |
| JP | 5-114883 A | 5/1993 |
| JP | 5-153120 | 6/1993 |
| JP | 7-107546 | 4/1995 |
| JP | 8-008874 | 1/1996 |
| JP | 8-307337 A | 11/1996 |
| KR | KO 92-702109 | 8/1992 |
| WO | WO 95/12934 | 5/1995 |

* cited by examiner

METHOD AND APPARATUS OF A MOBILE COMMUNICATION SYSTEM WHICH REDUCES POWER CONSUMPTION BY OBSERVING ONLY THE STARTING SLOT ON A TDMA RADIO CHANNEL

TECHNICAL FIELD

The present invention relates to a mobile communication system which communicates between a base station and a plurality of mobile stations using the TDMA method, and particularly, to a mobile communication system which is able to reduce the electrical power consumed by a mobile station which employs the TDMA method to receive data signals.

BACKGROUND ART

In the conventional technology, when a data signal for a mobile station is generated, a base station that uses the TDMA method for communication searches for a vacant slot in a TDMA channels, and transmits the data signal using the vacant slot immediately after generation of the data signal. Meanwhile, a mobile station monitors all slots, and receives the data signal in the slot if that data signal is addressed to that station.

In this case, however, in order to determine whether a data signal is addressed to itself, the mobile station must demodulate a data signal in every received slot and read a mobile identifier which is contained in each slot. Electrical power is therefore consumed by the mobile station in carrying out the above mentioned procedures. At the same time, it is necessary to extend the signal waiting time of the mobile station, and to reduce the size of the mobile station's battery. In order to meet these requirements, it is thus desirable to reduce as much as possible the electrical power used in the data signal detection.

DISCLOSURE OF INVENTION

The present invention was developed in consideration of the above circumstances, and has as its objective the provision of a mobile communication system wherein it is possible to reduce the electrical power consumed by the mobile station during the signal reception waiting period, by observing only the starting slot on a TDMA radio channel.
(1) A mobile communication system that transmits data signal from base station to a plurality of mobile stations by using TDMA radio channel that consists of a plurality of slots; wherein said base station consists of a generating means for generating a head slot having a mobile station identifier which indicates a mobile station for transmission and continuous slots having a least part of said data signal, a transmission means for transmitting said head slot with starting slot which locates at predetermined position each of said a plurality of mobile stations, on said TDMA radio channel, and a transmission for transmitting said continuous slot with slot which continues said starting slot, each of said mobile stations consists of a observation means for observing said starting slot, a judging means for judging said mobile station identifier when said starting slot is a head slot, a receiving means for receiving said continuous slot when said mobile station identifier indicates oneself.

Therefore, according to the present invention, a mobile station monitors only a starting slot, so that it is possible to reduce the electrical power of the battery consumed by the mobile station to be shorten the operating time of a receiving apparatus, in comparison with in case where the mobile station monitors all slots.
(2) Said base station further consists of a transmission means for transmitting vacant slot which does not contain said data signal when there is no said data signal, said mobile station further consists of a stopping means for stopping a receiving operation until next of said starting slot when said starting slot is said vacant slot or said continuous slot.

Therefore, according to the present invention, when the received slot is a vacant slot or when received slot is a signal slot addressed to other mobile station, the mobile station stops reception of signal, so that it is possible to be shorten a delay time of the signal by transmitting continuously a plurality of signals.
(3) Said base station further consists of a generating means for generating synchronous words of various kinds which is for synchronizing to said slots, a transmission means for transmitting a synchronous word selected from said synchronous words of various kinds to contain in said slots, on the basis of the information which indicates whether the monitored slot is said starting slot or not, said mobile stations further consists of a judging whether said slot is said starting slot or not, on the basis of the kind of said synchronous word.

Therefore, according to the present invention, the mobile station can judge the position of the starting slot at the same time as synchronizing of slots.
(4) Base station sets a common starting slot at a predetermined position on said TDMA radio channel, and farther consists of a generating means for a continuous slot having mobile station identifiers which indicate said plurality of mobile stations and at least a part of said data signal when said base station transmits common data signal for a plurality of mobile stations, a transmission means for transmitting said starting slot with said common starting slot, a transmission means for transmitting said continuous slot with said slots which follows said common starting slot, said mobile station further consists of a monitoring means for monitoring said common starting slot, in addition to said starting slot which determined for every mobile station, a recognition means for recognizing said mobile station identifier when said common starting slot is said starting slot, a receiving means for receiving said continuous slot if there is a mobile station identifier which indicates itself among said mobile station identifiers.

Therefore, according to the present invention, it is possible to reduce the electrical power of the battery consumed by the mobile station, and to ensure signal transmission addressed to each mobile station by arranging to disperse slot of each mobile station. Furthermore, it is possible to shorten a delay time wherein a common signal is transmitted to a plurality of mobile stations by set a common starting slot that a plurality of mobile stations begin reception commonly, in comparison with the case where an individual slot is used each mobile station. In addition, it is possible to improve the using efficiency of the TDMA radio channel by that overlapped signal does not transmit.
(5) Said base station further consists of a transmission means for transmitting a informing signal indicating a position of said starting slot for each of mobile stations, said mobile station further consists of a starting means for starting a receiving operation from said starting slot which is indicated by said information signal.

Therefore, according to the present invention, it is possible to inform immediately presence of data signal to the mobile station, in comparison with the case where data signals are transmitted successively to one or more mobile stations, by informing presence of data signal to one or more mobile stations with the informing signal.

(6) Said mobile station further consists of a transmission means for transmitting a receiving mode which indicates whether it monitors all slots or it monitors only starting slot, an observing means for observing said slot by the receiving mode which is transmitted by said transmission means, said base station further consists of a receiving means for receiving said receiving mode, a transmission means for transmitting said data signal to a mobile station which transmits said receiving mode from a slot immediately after that said data signal is generated, when said receiving mode indicates to monitor said all slots, a transmission means for transmitting said data signal for a mobile station which transmitted said receiving mode from said starting slot when said receiving mode indicates that said mobile station monitors only said starting slot.

Therefore, according to the present invention, it is possible to switch a transmission mode by request from the mobile station in the base station. Furthermore, it is possible to immediately transmit data signal by switching a succession transmission mode, in the case where the traffic is large or the permitted transmission delay is small. In addition, it is possible to change a transmission procedure to the intermittent transmission mode at the start of communication or during communication, according to the limit of the battery consumption in the mobile station.

(7) Said base station further consists of a transmission means for transmitting a slot designating signal which contains information indicating a position of said starting slot, said mobile station further consists of a receiving means for receiving said slot designating signal, a judgment means for judging a position of said starting slot based on said slot designating signal.

Therefore, according to the present invention, it is possible to determine the arrangement of the starting slot and the common starting slot, according to the conditions.

BEST MODE FOR CARRYING OUT THE INVENTION

The best mode for carrying out the present invention will now be described with reference to the drawings.

First Embodiment

A. Hardware Structure of First Embodiment

Figure 1:
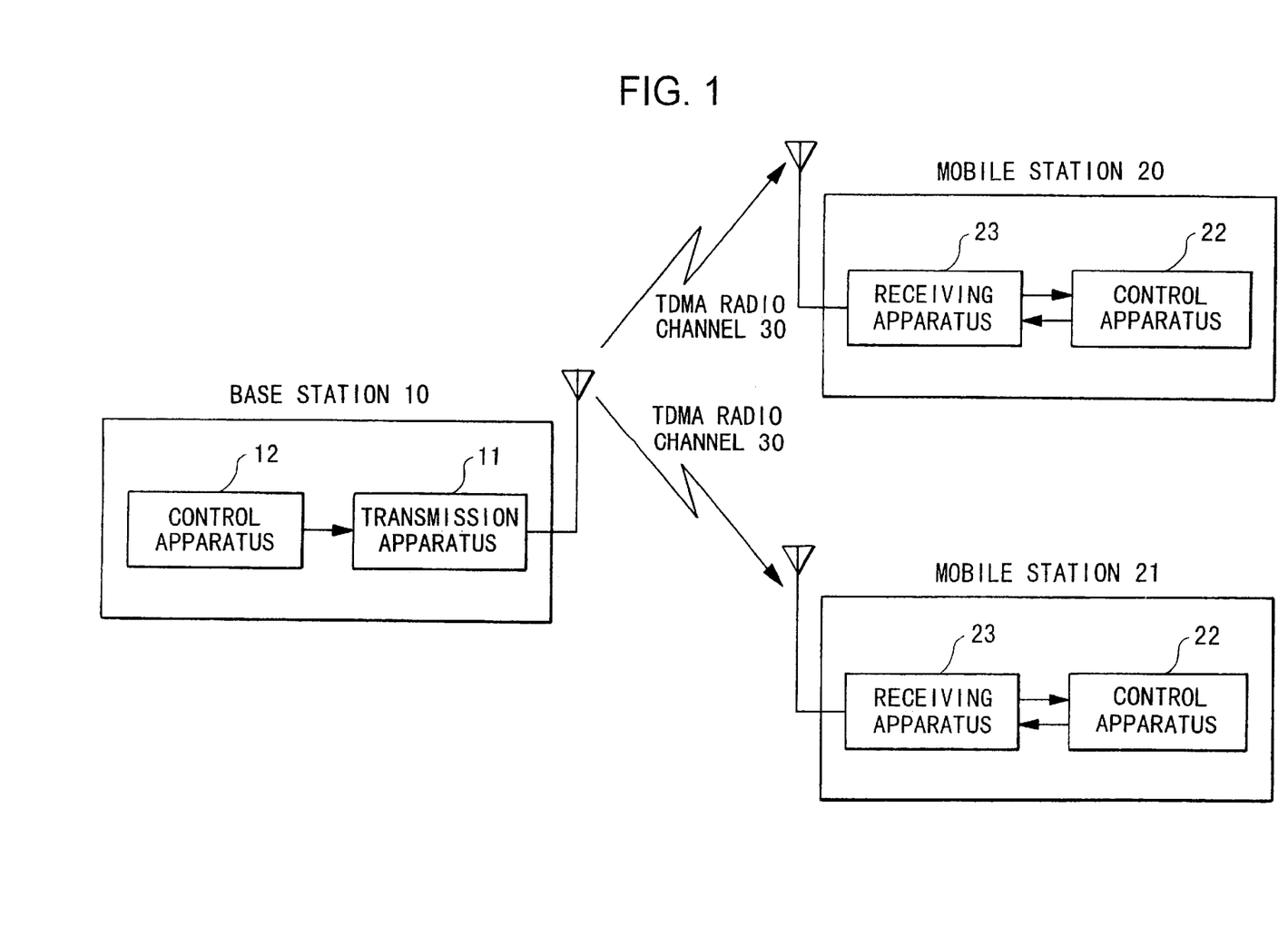
FIG. 1 is a block diagram showing the structure of a communication system of a first embodiment in this invention.

FIG. 1 is a block diagram showing the structure of the communication system of a first embodiment in this invention. In FIG. 1, base station 10 and one or more mobile stations 20, 21 are set up in a mobile communication system. Base station 10 and mobile stations 20, 21 communicate through a TDMA radio channel. Base station 10 consists of transmission apparatus 11, which transmits a data signal over TDMA radio channel 30, and control apparatus 12, which controls the operation of transmission apparatus 11 by generating a signal. Mobile station 20 consists of receiving apparatus 23, which receives a data signal transmitted over TDMA radio channel 30, and control apparatus 22, which controls the operation of receiving apparatus 23 by analyzing the signal.

B. Data Structure in First Embodiment

Figure 2:
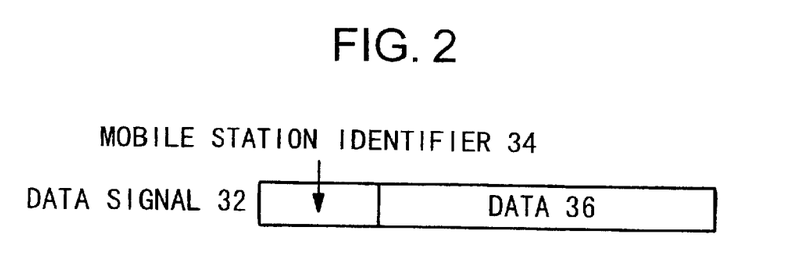
FIG. 2 is a conceptual diagram showing the structure of data signal 32.

An explanation will be made of various data structures which are used in the first embodiment. FIG. 2 is a conceptual diagram showing the structure of data signal 32 which is transmitted from base station 10 to mobile stations 20, 21. Data signal 32 consists of mobile station identifier 34, which indicates an address, and data 36, which is transmitted to mobile stations 20, 21.

Figure 3:
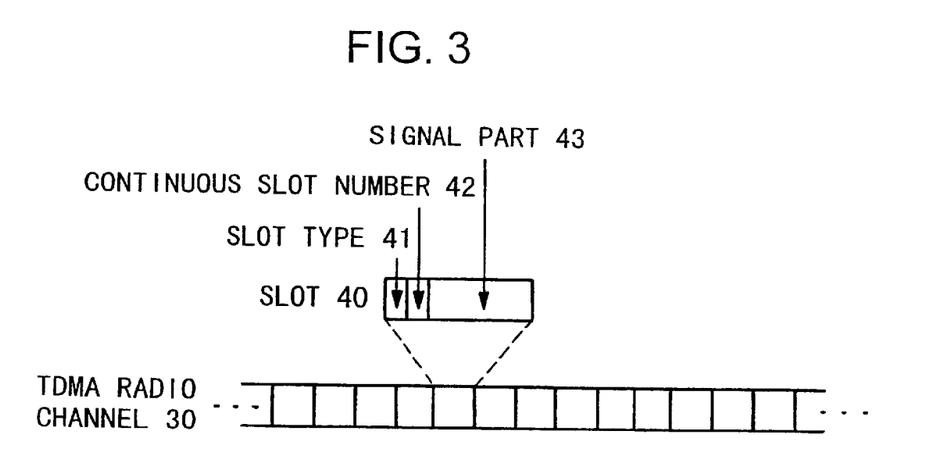
FIG. 3 is a conceptual diagram showing the structure of TDMA radio channel 30.

FIG. 3 is a conceptual diagram showing the structure of TDMA radio channel 30. TDMA radio channel 30 consists of continuous slots 40. Each slot 40 carries information regarding slot type 41 which indicates the type of slot, continuous slot number 42 which indicates the number of slots which are continuous to form data signal 32, and signal part 43. Transmission of data signal 32 may require more than one signal part 43.

Figure 4:
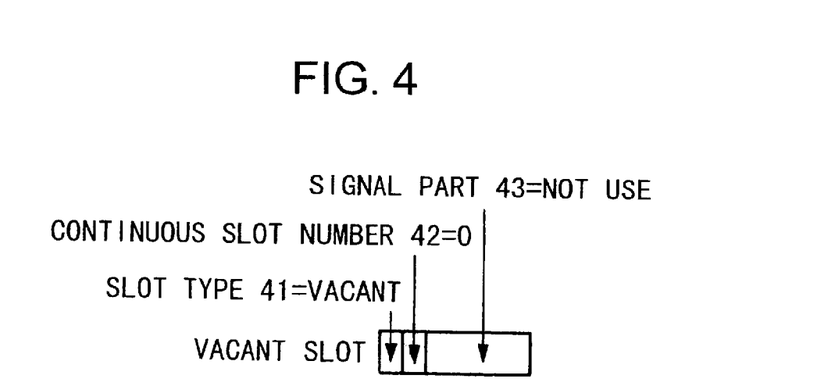
FIG. 4 is a conceptual diagram showing the structure of a vacant slot.

FIG. 4 is a conceptual diagram showing the structure of a vacant slot 40 where a data signal is not contained. Slot type 41 indicates that the slot is a vacant slot, and continuous slot number 42 indicates "0". Signal part 43 is not used.

Figure 5A:
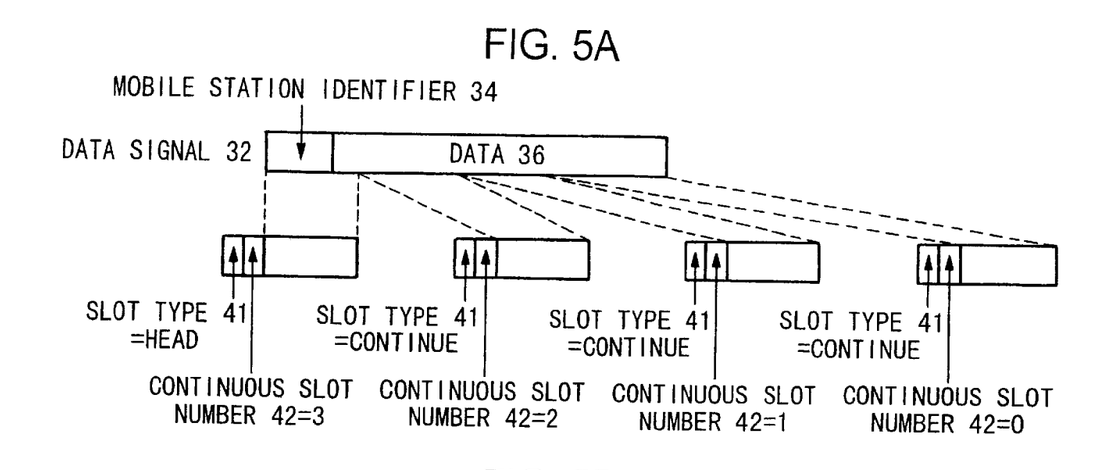
FIG. 5 is a conceptual diagram showing the structure of a signal slot used for transmitting a data signal.

Next, FIG. 5(A) is a conceptual diagram showing the structure of a signal slot wherein data signal 32 is transmitted by using a plurality of slots. In the head slot, slot type 41 indicates that the slot is a head slot. Furthermore, the number of slots which continue after the head slot, i.e. "3", is indicated by continuous slot number 42. The head portion of data signal 32 is set in signal part 43. Next, slot type 41 of the continuous slots indicates that the slots are continuous slots. The remaining portion of data signal 32 is set in division in signal parts 43 of the continuous slots.

Figure 5B:
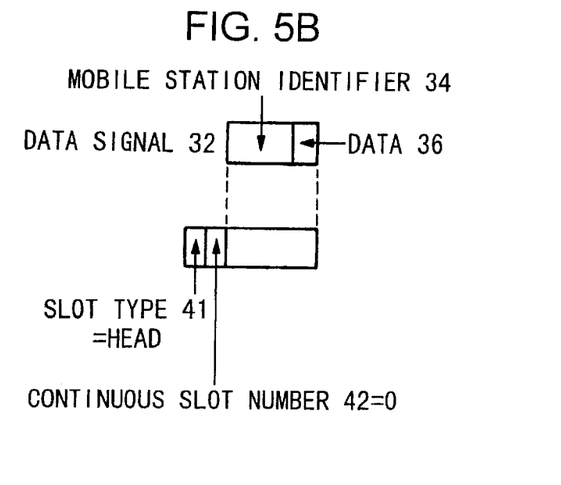

However, a short data signal 32 may be transmitted, using only one slot. In this case, only a single slot as shown in FIG. 5(B) is necessary. Slot type 41 of this slot indicates that the slot is the head slot, and the number of continuous slots 42 is "0".

Figure 6:
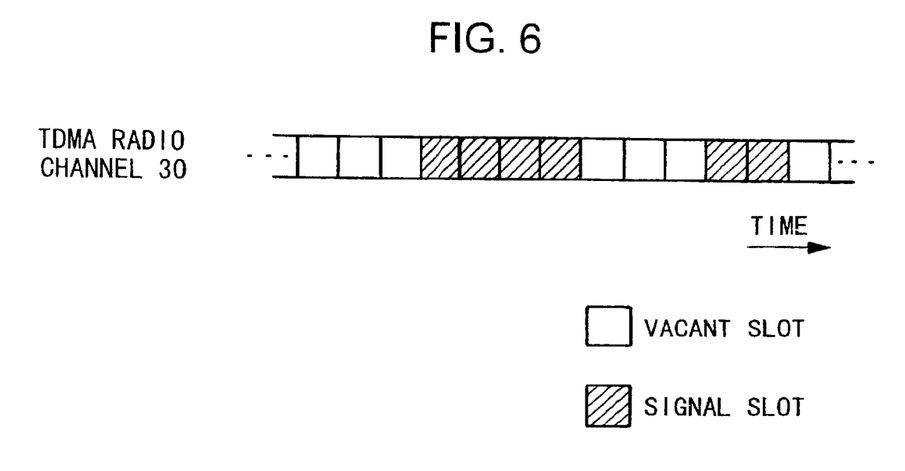
FIG. 6 is a conceptual diagram showing a transmission method of the vacant slot and the signal slot in the TDMA radio channel.

Next, FIG. 6 is a conceptual diagram showing the state wherein vacant slots having no data signal 32 and signal slots having data signal 32 exist on the TDMA radio channel. In FIG. 6, the hatched slots are signal slots, while the slots without hatching are vacant slots. When data signal 32 is generated, a signal slot or a plurality of signal slots are used to transmit data signal 32. The vacant slots exist during the period when signal slots are not transmitted.

Figure 7:
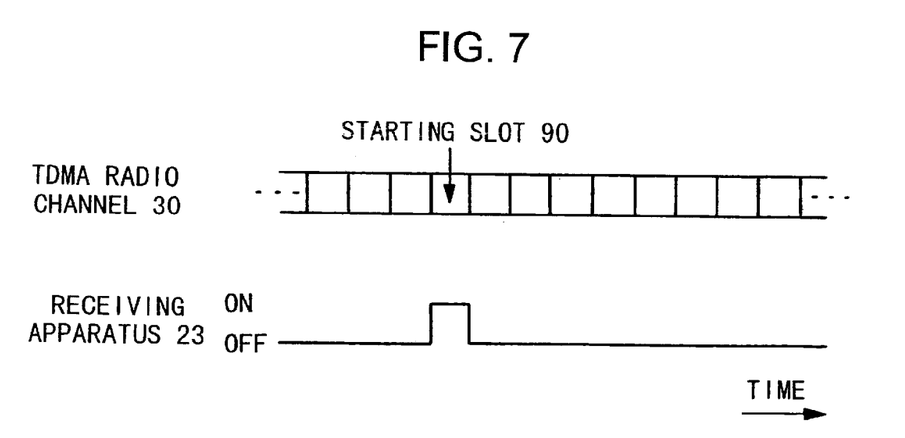
FIG. 7 is a conceptual diagram showing the procedures of a receiving apparatus wherein there is no signal to be transmitted from a base station to mobile stations.

C. Operation of First Embodiment
C.1. Monitoring by Mobile Station for Data Addressed to Itself FIG. 7 is a conceptual diagram showing the procedures of base station 10 in the case where there is no signal to be transmitted. In this case, control apparatus 12 causes transmission apparatus 11 to designate as a vacant slot every slot on TDMA radio channel 30. Assume that one of the slots is generated at a fixed timing on TDMA radio channel 30. This slot is called the "starting slot". Control apparatus 22 of mobile stations 20, 21 instructs receiving apparatus 23 to receive a signal contained in staring slot 90 apparatus 23 to start receiving.

Receiving apparatus 23 receives a signal contained in starting slot 90 when it receives the instructions, and supplies the signal contained in slot 90 to control apparatus 22. Control apparatus 22 detects whether supplied starting slot 90 is designated as a vacant slot. If the starting slot 90 is designated as a vacant slot, control apparatus 22 judges that a signal addressed to itself has not occurred, and instructs receiving apparatus 23 to stop receiving the slots.

Figure 8:
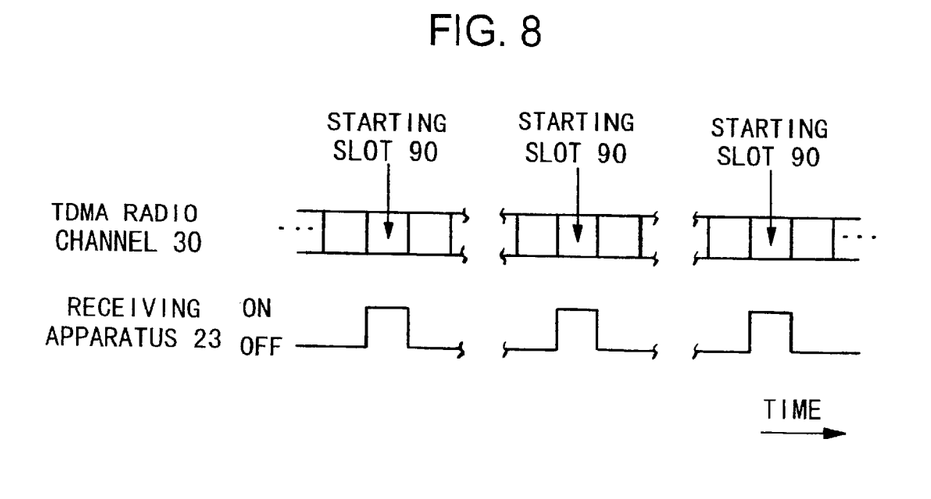
FIG. 8 is a conceptual diagram showing the procedures of a receiving apparatus wherein the starting slots are arranged periodically on TDMA radio channel.

Starting slot 90 appears periodically on TDMA radio channel 30 as shown in FIG. 8. Therefore, mobile stations 20, 21 may monitor only starting slot 90.

C.2. Data Transmission (Single) for Mobile Station

An explanation will now be made of the operation when various data are transmitted to mobile stations 20, 21, beginning with the case where only one data signal is transmitted.

Figure 9:
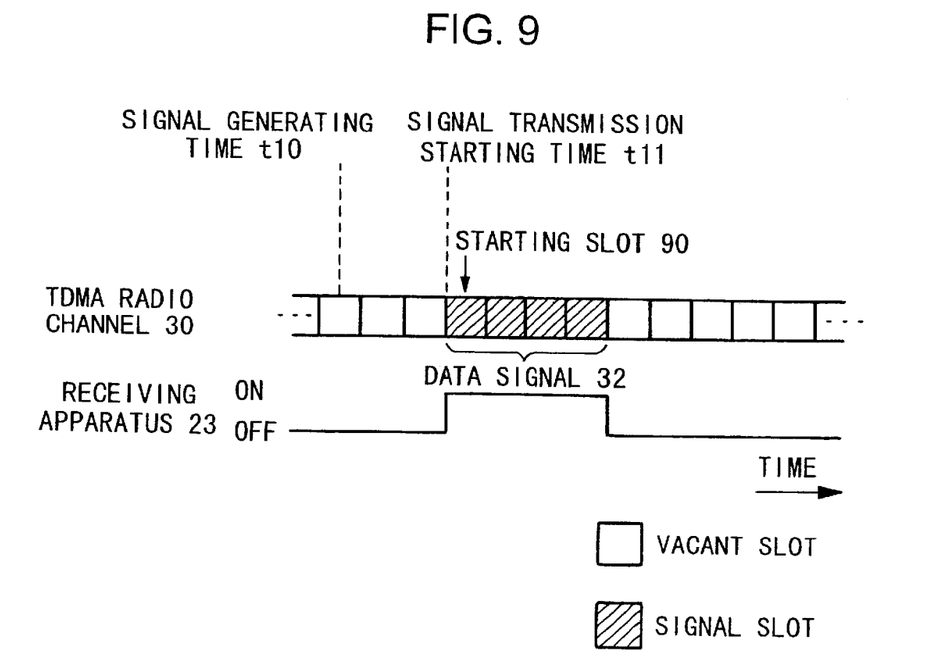
FIG. 9 is a conceptual diagram showing the procedures of a receiving apparatus wherein there is a signal to be transmitted from a base station to mobile stations.

As shown in FIG. 9, base station 10 that has a signal generated in the midst of an interval between two starting slots 90 waits for a next starting slot 90. For example, when data signal 32 to be transmitted to mobile station 20 occurs at time t10, control apparatus 12 of base station 10 holds the transmission of data signal 32 until transmission starting time t11 when the next starting slot 90 shows up. Next, control apparatus 12 causes transmission apparatus 11 to designate as vacant slots all of the slots preceding to the next starting slot 90, and to start the transmission of data signal 32 from starting slot 90. When transmission apparatus 11 completes the transmission of data signal 32, control apparatus 12 causes transmission apparatus 11 to designate subsequent slots as vacant slots.

Control apparatuses 22, 22 of mobile stations 20, 21 instruct receiving apparatuses 23, 23 to start signal reception at starting slot 90. Consequently, receiving apparatuses 23, 23 receive the information in starting slot 90, and supply the information to control apparatuses 22, 22. Control apparatuses 22, 22 determine whether to continue receiving the signals, based on the information received from receiving apparatuses 23, 23. That is, control apparatuses 22, 22 continue receiving signals if the signal contained in the starting slot is data signal 32 addressed to that mobile station. After that, control apparatuses 22, 22 instruct receiving apparatuses 23, 23 to stop signal reception after completion of reception of data signal 32. On the other hand, if starting slot 90 is designated as a vacant slot or curries a data signal addressed to another mobile station, the signal reception is immediately terminated.

Figure 10:
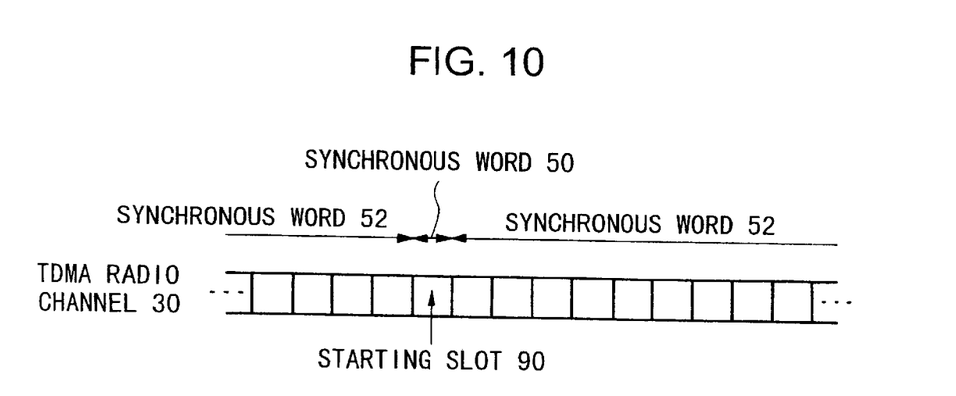
FIG. 10 is a conceptual diagram showing the method for determining the position of the starting slot at the mobile stations.

An explanation using FIG. 10 will now be made of the method by which mobile stations 20, 21 determine the position of starting slot 90 on TDMA radio channel 30. First, each slot contains a synchronous word so that mobile stations 20, 21 can synchronize with the slots. When communication is started, mobile stations 20, 21 continuously receive every slot on TDMA radio channel 30, and synchronize with these slots. In this embodiment, two types of synchronous words 50, 52 are employed. Base station 10 transmits synchronous word 50, using slot 90, and transmits synchronous words 52, using the other slots. Mobile stations 20, 21 continuously check every slot in the start of communications, and determine that "the slot in which synchronous word 50 is contained is starting slot 90". Consequently, mobile stations 20, 21 can synchronize with the slots, while simultaneously determining the position of starting slot 90.

In the above mentioned operation, an interval between two neighboring staring slots 90 may be determined dynamically based on a delay in downward transmission of a signal requested by mobile stations 20, 21 and the capacity of a battery used. For example, in the case where there is a low volume of signal traffic, and a large delay is permitted between the occurrence of a signal in base station 10 and the transmission of the signal to mobile stations 20, 21, then an interval between two neighboring starting slots 90 may be larger. Conversely, when a large delay is not permitted, then an interval between two neighboring starting slots 90 may be shorter.

In the above mentioned operation, mobile stations 20, 21 monitor only starting slots 90, so that the operating time of receiving apparatus 23 becomes shorter than it is in the case when all slots are monitored. Therefore, it is possible to reduce battery consumption in mobile stations 20, 21.

C.3. Data Transmission (Plural) for Mobile Station

Figure 11:
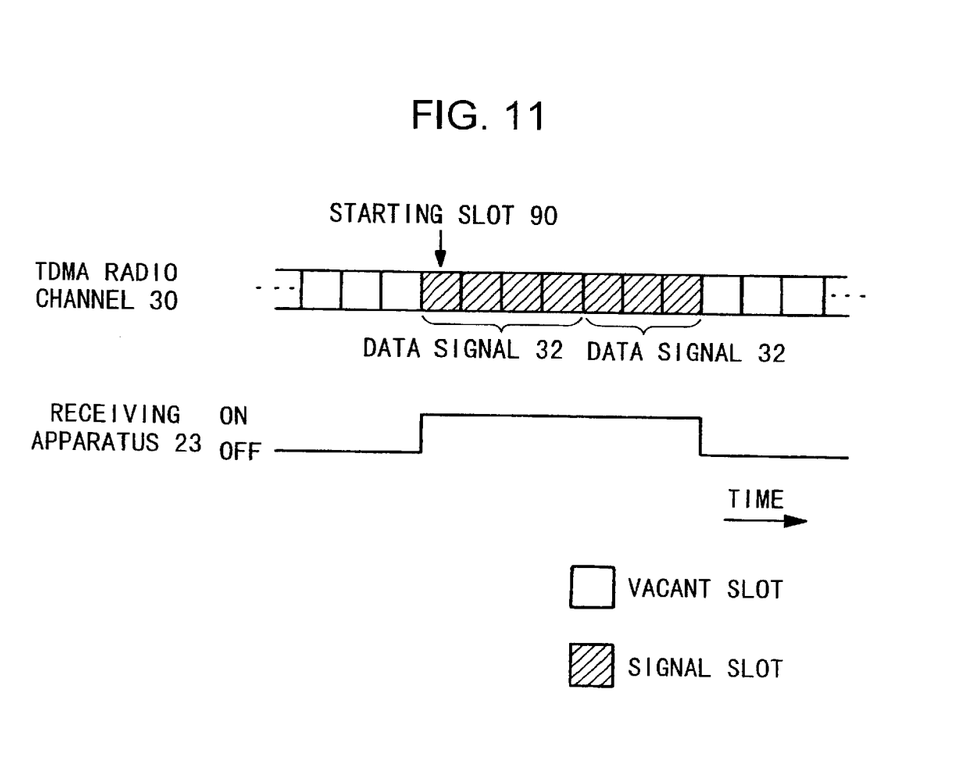
FIG. 11 is a conceptual diagram showing the procedures of the mobile stations wherein there are two or more signals to be transmitted from a base station to a mobile station.

Next, an explanation will be made of the operation in the case where a plurality of data signals 32 are transmitted from base station 10 to mobile stations 20, 21. FIG. 11 is conceptual diagrams showing the state where two data signals 32 to be transmitted from base station 10 are present. In base station 10, when two data signals 32 occur, control apparatus 12 holds the transmission of data signal 32 until starting slot 90 comes up. Next, control apparatus 12 instructs transmission apparatus 11 to transmit two data signals 32, using starting slot 90, and two data signals 32 are transmitted from transmission apparatus 11. When the transmission of two data signals 32 is complete, control apparatus 12 causes transmission apparatus 11 to designate subsequent slots as vacant slots.

Receiving apparatuses 23, 23 of mobile stations 20, 21 receive a signal contained in starting slot 90, and transmit the received signal to control apparatuses 22, 22. Next, control apparatuses 22, 22 determine whether to continue receiving or not based on the received signal from receiving apparatuses 23, 23. That is, if the mobile identifier 34 identifying that mobile station is included in signal part 43 of the starting slot, then control apparatuses 22, 22 instruct receiving apparatuses 23, 23 to receive signals from of continuous slots which is indicated by continuous slot number 42. Receiving apparatuses 23, 23 receive signals contained in the identified number of consecutive slots according to the instructions. Furthermore, after reception of signals from those consecutive slots, receiving apparatuses 23, 23 receive another slot. If this slot contains a mobile identifier 34 that indicates that mobile station, then receiving apparatuses 23, 23 further receive signals from the number of continuous slots which is indicated by continuous slot number 42.

On the other hand, if the received slot is designated a vacant slot or is for another mobile station, then control apparatuses 22, 22 instruct receiving apparatuses 23, 23 to stop signal reception. Therefore, as a result of the above-mentioned operation, it is possible to shorten the delay time of the signal by consecutively transmitting a plurality of signals.

C.4. Volley Informing

Figure 12:
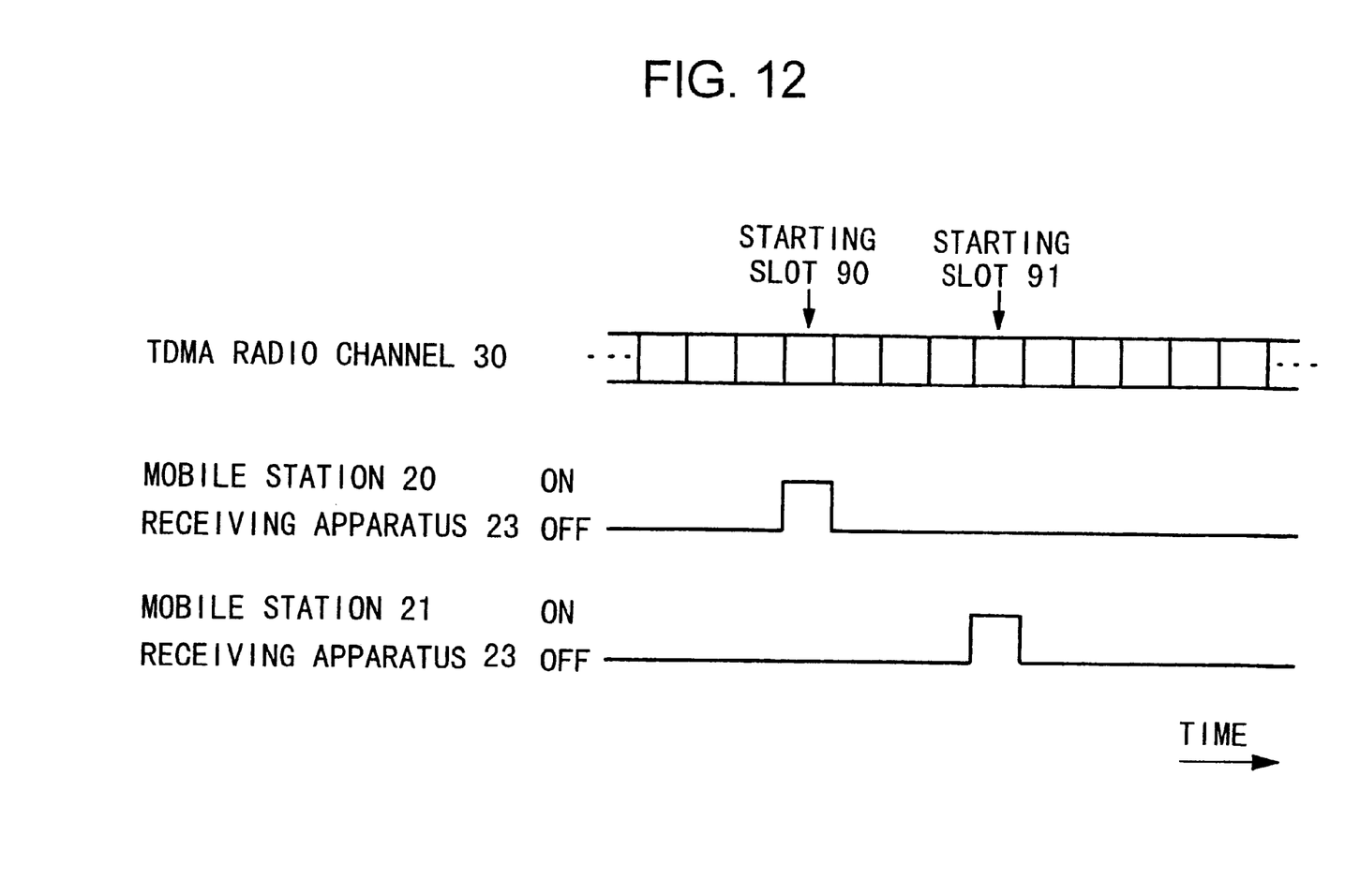
FIG. 12 is a conceptual diagram showing an example of the procedures of a base station and a plurality of mobile stations.

Next, an explanation will be made with reference to FIGS. 12 and 13 of a volley informing operation in which a common signal is transmitted to a plurality of mobile stations. As shown in FIG. 12, base station 10 transmits signals for mobile station 20 from starting slot 90, and transmits signals for mobile station 21 from starting slot 91. Starting slots 90 and 91 contain the same signal. Mobile station 20 monitors starting slot 90, and mobile station 21 monitors starting slot 91.

Figure 13:
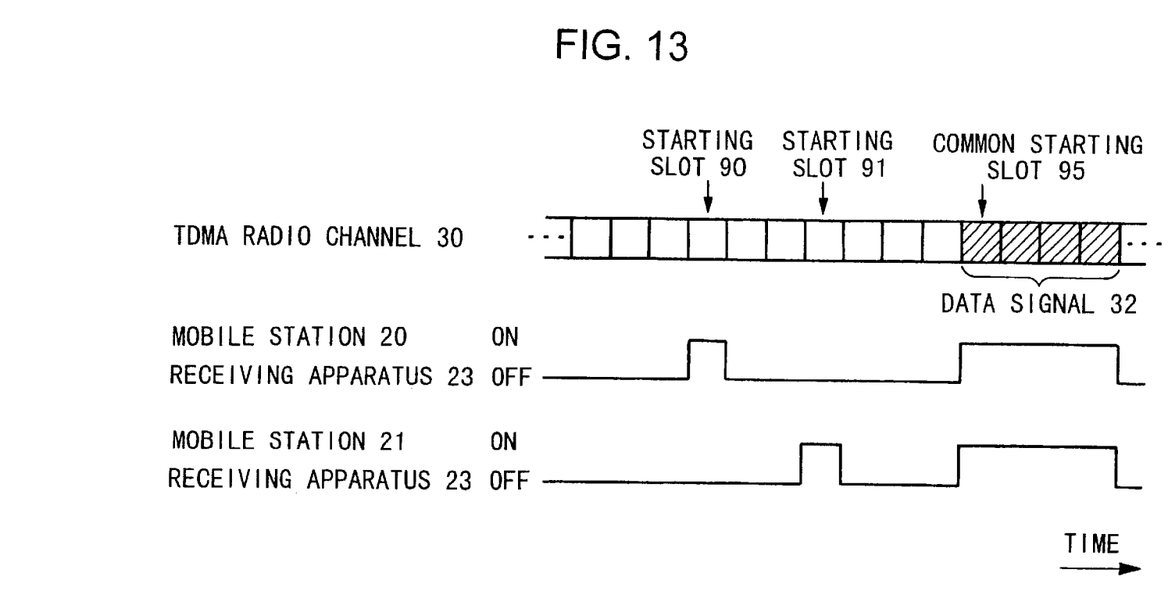
FIG. 13 is a conceptual diagram showing the procedures of a base station and a mobile station wherein the base station transmits a common signal to a plurality of mobile stations.

As shown in FIG. 13, base station 10 transmits data signal 32 to both mobile stations 20 and 21 using common starting slot 95. Mobile station identifier 34 of data signal 32 indicates both mobile station 20 and mobile station 21. Note that here the position of common starting slot 95 on the TDMA radio channel is determined in advance. Mobile stations 20, 21 monitor common starting slot 95, in addition to starting slot 90 or 91. If common starting slot 95 contains a signal addressed to itself, then mobile stations 20, 21 stop reception after receiving signals from the slots which follow common starting slot 95. On the other hand, if the received slot is designated as a vacant slot or curries a data signal slot for another mobile station, then mobile stations 20, 21 stop reception immediately.

As a result of the above described operation, it is possible to reduce the amount of stored energy consumed in the battery of the mobile station, while ensuring signal transmission for each mobile station, by defining a separate starting slot for each mobile station. Furthermore, it is possible to shorten the delay time in the case where a common signal is transmitted to a plurality of mobile stations by providing common starting slot 95 from which a plurality of mobile stations begin signal reception in common, as compared to the delay time in the case where an individual slot is used for each mobile station. In addition, it is possible to improve the utilization efficiency of the TDMA radio channel 30 because there is no over-lapped signal transmission.

C.5. Mode Switching

A conventional mobile station continuously monitors a TDMA radio channel. In the present invention, it is of course acceptable to mix a conventional mobile station and a mobile station which monitors only starting slot 90 based on this embodiment in the communication system. It is desirable that although monitoring only starting slots according to the present invention, a mobile station is switched to monitor every slot on TDMA radio channel if the traffic volume becomes large, or a permissible delay in downward transmission is short.

Thus, in this embodiment, in that case, it is possible to switch the operating mode of mobile stations 20, 21 by control of base station 10, and to change the transmission mode of base station 10. Conversely, base station 10 may switch the transmission mode at the request of mobile stations 20, 21.

Figure 14:
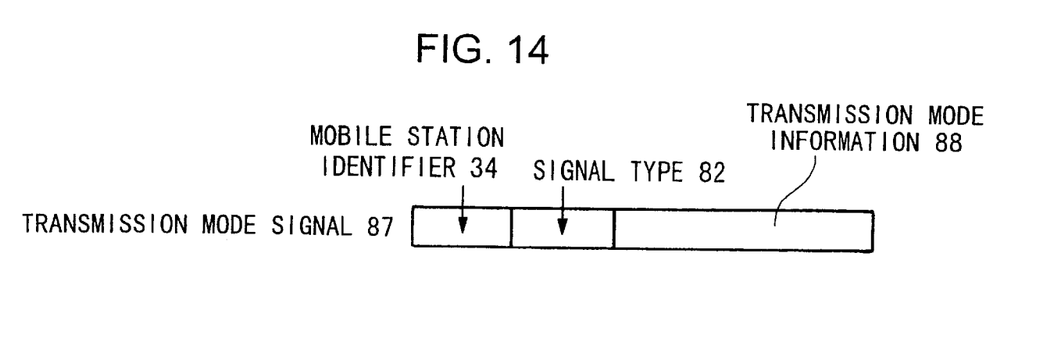
FIG. 14 is a conceptual diagram showing the structure of a transmission mode signal.

FIG. 14 is a conceptual diagram showing the structure of transmission mode signal 87 which requests the switching of the transmission mode from mobile stations 20, 21 to base station 10. Transmission mode signal 87 consists of mobile station identifier 34, signal type 82 showing that the signal is the transmission mode signal, and transmission mode information 88 showing the transmission procedure of the signal. Transmission mode information 88 indicates a continuation transmission mode and an intermittent transmission mode, for example. In the continuous transmission mode, the transmission of data signals. In the intermittent transmission mode, the transmission of data signals starts with starting slot 90 and common starting slot 95 only. Meanwhile, mobile stations 20, 21 transmit transmission mode signal 87 to base station 10 before a communication or during a communication. When base station 10 receives transmission mode signal 87, base station 10 transmits data signals according to the transmission procedure requested by mobile station 20 or 21.

By the above mentioned operation, in the case where the volume of traffic is large, or the permissible transmission delay is small, it is possible to carry out transmission at a high rate in the same way as the conventional technique, by switching to the continuous transmission mode. Furthermore, it is possible to change the transmission procedure to the intermittent transmission mode at the start of communication or during communication, according to the capacity of a battery used in the mobile station. In addition, it is possible to change an interval between two neighboring starting slots based on transmission mode signal 87.

Furthermore, in the first embodiment, although base station 10 is requested by mobile stations 20, 21 to change the transmission mode, it is also acceptable for base station 10 to switch the transmission mode of each mobile station 20, 21. In this case, base station 10 has a list(table) that indicates a transmission mode suitable for each mobile station and switches the transmission mode according to the list. Each of mobile stations 20, 21 is given a unique mobile identifier respectively, so that base station 10 may store in the list a transmission mode of each mobile station in relation to the mobile identifier. The information in the list is set by some input means or other in advance.

Second Embodiment

A. Hardware Structure and Data Structure of Second Embodiment

The hardware structure of the second embodiment is the same as that of the first embodiment, however, the data structure differs slightly, as described below.

That is, in this second embodiment, starting slot information 85 showing the position of starting slot 90 for each mobile station is transmitted from base station 10 to mobile stations 20, 21 using informing signal 80. Base station 10 transmits one or more data signal 86 to mobile stations 20, 21 after transmission of informing signal 80.

Figure 15:
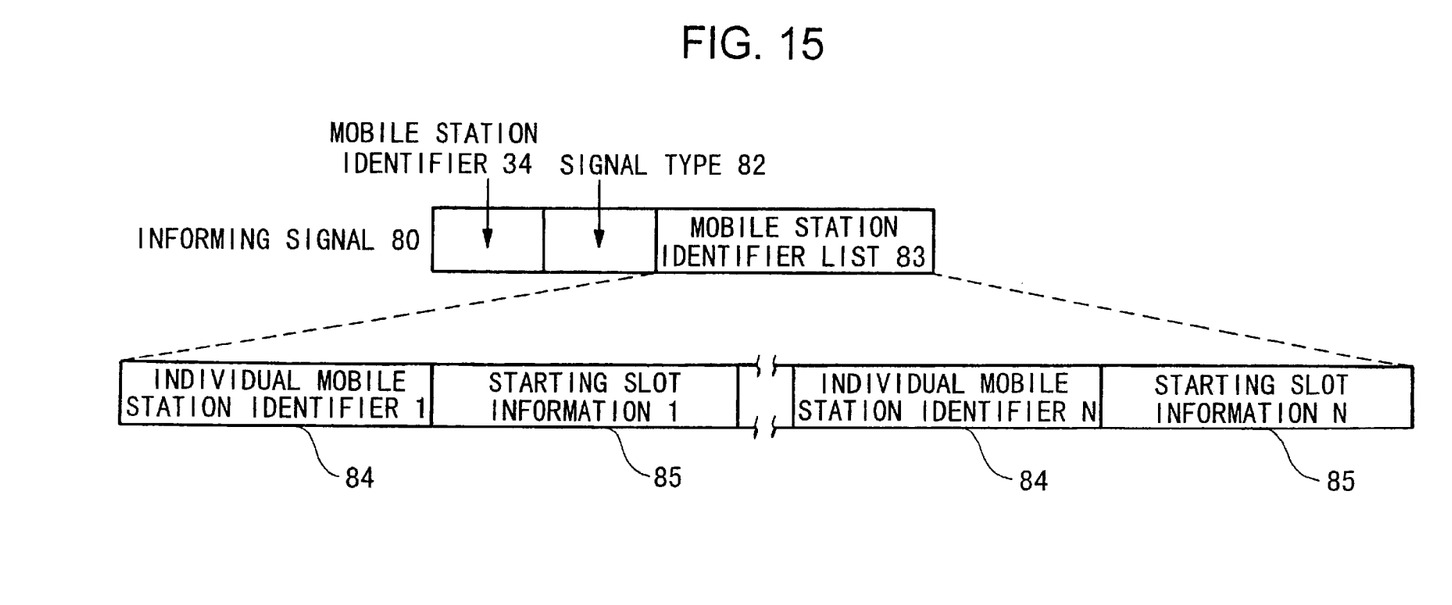
FIG. 15 is a conceptual diagram showing the structure of an informing signal.

FIG. 15 is a conceptual diagram showing the structure of informing signal 80. Informing signal 80 consists of mobile station identifier 34 for identifying one or more mobile stations which are to receive the informing signal, signal type 82 which indicates that it is an informing signal, and mobile station identifier list 83. Mobile station identifier list 83 contains individual mobile station identifiers 84 which indicate designations of one or more signals, and starting slot ion 85 which indicates the position of the starting slot of data signal 86.

Figure 16:
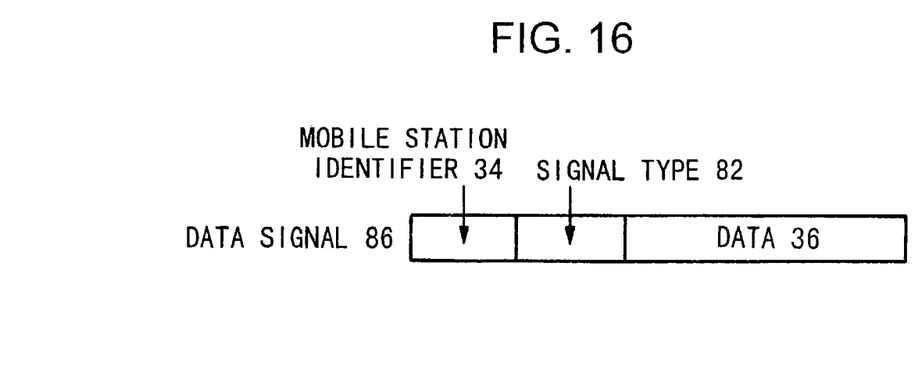
FIG. 16 is a conceptual diagram showing the structure of a data signal.

FIG. 16 is a conceptual diagram showing the structure of data signal 86. Data signal 86 consists of mobile station identifier 34 for identifying a mobile station, signal type 82 which indicates that it is a data signal, and data 36.

B. Operation of Second Embodiment

Next, an explanation will be made of the operation of base station 10 and mobile station 20 with reference to FIG. 17. First, base station 10 starts to transmit informing signal 80, using common starting slot 95. Meanwhile, mobile station 20 and mobile station 21 check every common starting slot 95. If signal type 82 of the received signal indicates an informing signal, then mobile station 20 or 21 reads out starting slot information 85 which follows the individual mobile station identifier 84 for that station.

When data signal 86 for mobile station 20 and data signal 86 for mobile station 21 are generated, base station 10 prepares informing signal 80 which carries (1) mobile station identifier 34 indicating that mobile stations 20 and 21 are to receive this signal, (2) individual mobile station identifier 84 and staring slot information 85 for mobile station 20 and (3) individual mobile station identifier 84 and staring slot information 85 for mobile station 21, and transmits this informing signal 80, using common starting slot 95. Next, base station 10 transmits data signal 86 for mobile station 20, using starting slot 90 the position of which is indicated by starting slot information 85 which follows the individual mobile station identifier 84 for mobile station 20. Furthermore, base station 10 transmits data signal 86 for mobile station 21, using starting slot 91 the position of which is indicated by starting slot information 85 which follows the individual mobile station identifier 84 for mobile station 21. Data signal 86 is transmitted, using one or more slots in the same manner as shown in FIG. 5.

Mobile station 20 begins receiving the signal from starting slot 90 the position of which is indicated by starting slot information 85 which follows the individual mobile station identifier 84 for mobile station 20. If the received signal is addressed to that station, then mobile station 20 continues signal reception. On the other hand, if the received slot is designated as a vacant slot or curries a data signal addressed to another station, then mobile station 20 halts signal reception.

An explanation will now be made of how starting slot 90 may become a slot for another station. A starting slot is assigned to each mobile station, so that, in general, the reception of information is complete before the generation of a starting slot for another station occurs. However, when an interval between two neighboring starting slots becomes narrow due to an increase in the number of mobile stations in an area, or the traffic for a specific mobile station increases notably, slots necessary to transmit a data signal to one mobile station may include a neighboring starting slot for another mobile station.

Figure 17:
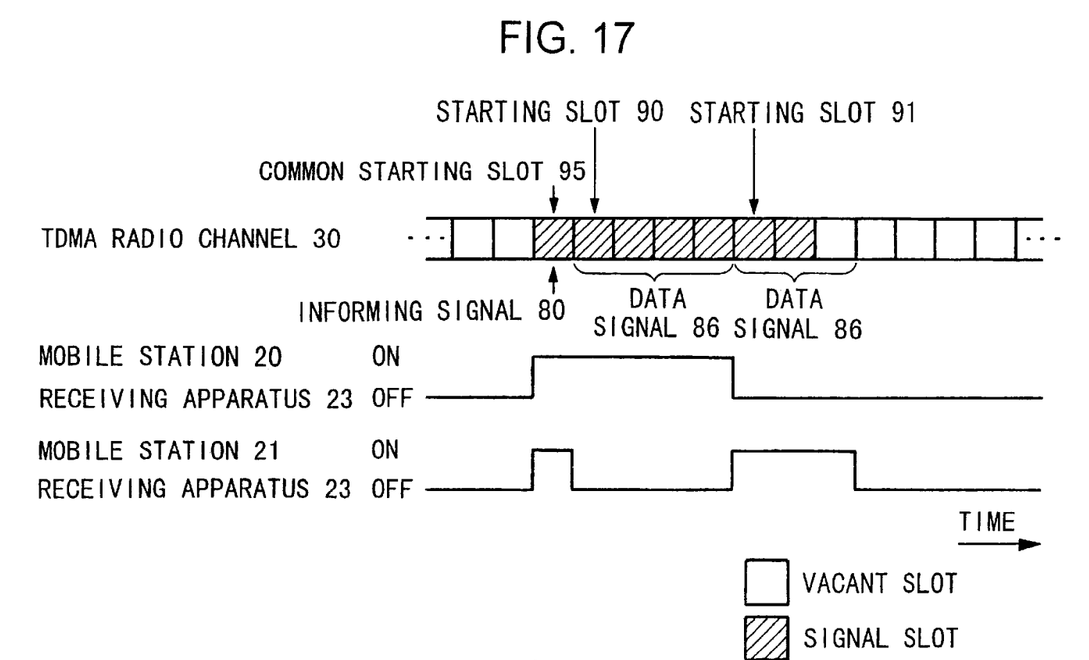
FIG. 17 is a conceptual diagram showing the procedures of mobile stations in the case where the arrangement of the starting slots is informed by means of an informing signal.

In the example shown in FIG. 17, starting slot 90 immediately succeeds common starting slot 95, so that mobile station 20 receives data signal 86 from starting slot 90 immediately after receiving informing signal 80 from starting slot 95. After that, mobile station 20 stops the reception of the data signal. Furthermore, starting slot 91 is separated away from common slot 95, so that mobile station 21 receives informing signal 80, then terminates the signal reception and resumes the signal reception from starting slot 91. Further, mobile station 21 stops reception after receiving data signal 86.

In this second embodiment, the presence of a data signal is informed to one or more mobile stations by informing signal 80, so that it is possible to inform a mobile station of the presence or absence of a data signal more quickly as compared to the case where signals are transmitted successively to one or more mobile stations. Furthermore, it is possible to improve the utilization efficiency of the TDMA radio channel.

Variations of Present Invention

This invention may be practiced or embodied in still other ways without departing from the spirit or essential character thereof. Therefore, the preferred embodiments described herein are illustrative and not restrictive, the scope of the invention being indicated by the appended claims and all variations which come within the meaning of the claims are intended to be embraced therein.

For example, it is possible to realize various modifications as follows. i) Base station 10 may determine positions of starting slots 90, 91 and common starting slot 95 by calculation under algorithm. In this case, base station 10 may inform the positions of starting slots 90 and 91 in the first embodiment and the position of common starting slot 95 in the first and second embodiment, to mobile stations 20, 21 with slot designation signal 60.

Figure 18:
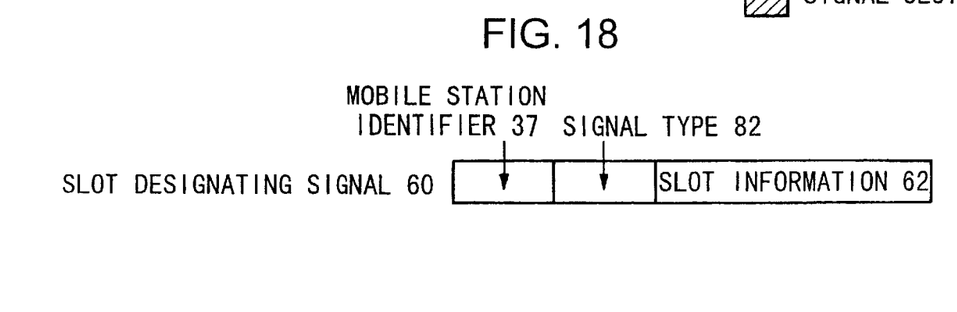
FIG. 18 is a conceptual diagram showing the structure of a slot designation signal, which designates the arrangement of starting slots or a common starting slot.

FIG. 18 is a conceptual diagram showing slot designation signal 60. Slot designation signal 60 consists of mobile station identifier 37 for identifying mobile station 20, signal type 82 which indicates that it is slot designation signal 60, and slot information 62. Slot information 62 indicates the positions of starting slots 90, 91 in the first embodiment and the position of common starting slot 95 in the first and second embodiment.

Base station 10, for example, determines the positions of starting slots 90, 91 and common starting slot 95 to increase the utilization efficiency of the radio channel by using parameters. For example, the parameters consist of the number of mobile stations, the permitted transmission delay, the amount of the individual signal for each mobile station, the amount of the common signal for a plurality of mobile stations, the occurrence characteristic of the signal, and so on.

ii) Slot designation signal 60 may be transmitted using a TDMA radio channel used for control which is different from a TDMA radio channel used for communication. In this case, mobile stations 20, 21 switch to a TDMA radio channel used for communication after they receive slot designation signal 60 over a TDMA radio channel for control. After that, mobile stations 20, 21 monitor designated starting slots 90, 91 and common starting slot 95. Therefore, it is possible to flexibly determine the positions of starting slots 90, 91 and common starting slot 95, according to conditions. In addition, mobile station 20 may determine the positions of starting slots 90, 91 and common starting slot 95, and may inform base station 10.

What is claimed is:

1. A method for transmitting data signals to one or more mobile stations through a TDMA radio channel which is divided into recurring rounds of slots, the method comprising the steps of:
   (a) defining in every round at least one starting slot for a mobile station, each starting slot being located at the same slot position in each round;
   (b) transmitting slot assignment information to the mobile station, using a common starting slot assigned commonly to a group of mobile stations including the mobile station, in order to notify the defined at least one starting slot to the mobile station; and
   (c) transmitting a data signal of a variable length to the mobile station, using one or more physically consecutive slots beginning with one of the defined at least one starting slot,
      wherein the mobile station only monitors, in each round, the defined at least one starting slot and the common starting slot and, when any one of the defined at least one starting slot carries a data signal addressed to it, receives the data signal from one or more physically consecutive slots beginning with the one of the at least one starting slot.

2. A method according to claim 1, wherein each slot carries information indicating a slot type thereof and a number of subsequent slots necessary to transmit any portion of a signal that remains to be transmitted, and whether or not it carries a part or the whole of the signal.

3. A method according to claim 2, wherein one type of slots is signal slots, which carry a data signal, and another type of slots is vacant slots, which do not carry a data signal.

4. A method according to claim 1, wherein an interval between two neighboring starting slots is changed according to a volume of communication traffic.

5. A method according to claim 1, further comprising the step of transmitting a synchronous word, using a slot, wherein the mobile station, at the beginning of a communication, checks every slot in a round to detect a position of the slot that contains the synchronous word and recognize the slot as its starting slot.

6. A method according to claim 1, further comprising the step of transmitting a second set of data signal of a variable length to the mobile station, using one or more physically consecutive slots immediately succeeding one or more physically consecutive slots used to transmit a first set of data signal of a variable length to the same mobile station, wherein the mobile station, after receiving the first set of data signal, checks a slot immediately succeeding the one or more physically consecutive slots for transmission of the first set of data signal to determine if there is any data signal addressed to the mobile station.

7. A method according to claim 1, further comprising the step of reassigning a new starting slot to the mobile station.

8. A method according to claim 1, wherein an interval between two neighboring starting slots is changed according to a time delay in transmission of data signals that occurs after the data signals are generated.

9. A network that transmits data signals to one or more mobile stations through a TDMA radio channel which is divided into recurring rounds of slots, the network comprising:
   (a) a slot assigner that defines in every round at least one starting slot for a mobile station, each starting slot being located at the same slot position in each round;
   (b) a slot assignment information transmitter that transmits slot assignment information to the mobile station, using a common starting slot assigned commonly to a group of mobile stations including the mobile station, in order to notify the defined at least one starting slot to the mobile station; and
   (c) a data signal transmitter that transmits a data signal of a variable length to the mobile station, using one or more physically consecutive slots beginning with one of the defined at least one starting slot,
      wherein the mobile station only monitors, in each round, the defined at least one starting slot and the common starting slot and, when any one of the defined at least one starting slot carries a data signal addressed to it, receives the data signal from one or more physically consecutive slots beginning with the one of the defined at least one starting slot.

10. A network according to claim 9, wherein each slot carries information indicating a slot type thereof and a number of subsequent slots necessary to transmit any portion of a signal that remains to be transmitted, and whether or not it carries a part or the whole of the signal.

11. A network according to claim 10, wherein one type of slots is signal slots, which carry a data signal, and another type of slots is vacant slots, which do not carry a data signal.

12. A network according to claim 9, wherein the transmitter transmits a second set of data signal of a variable length to the mobile station, using one or more physically consecutive slots immediately succeeding one or more physically consecutive slots used to transmit a first set of data signal of a variable length to the same mobile station, and the mobile station, after receiving the first set of data signal, checks a slot immediately succeeding the one or more physically consecutive slots for transmission of the first set of data signal to determine if there is any data signal addressed to the mobile station.

13. A network according to claim 9, wherein the slot assigner changes an interval between two neighboring starting slots according to a volume of communication traffic.

14. A network according to claim 9, further comprising the step of transmitting a synchronous word, using a slot, wherein the mobile station, at the beginning of communication, checks every slot in a round to detect a position of the slot that contains the synchronous word and recognize the slot as its starting slot.

15. A network according to claim 9, wherein the slot assigner reassigns a new starting slot to the mobile station.

16. A network according to claim 9, wherein the slot assigner changes an interval between two neighboring starting slots according to a time delay in transmission of data signals that occurs after the data signals are generated.

17. A method of receiving a data signal of a variable length by a mobile station through a TDMA channel which is divided into recurring rounds of slots, wherein at least one starting slot is defined for the mobile station at the same slot position in each round, the method comprising the steps of:
   (a) receiving at the mobile station, using a common starting slot assigned commonly to a group of mobile stations including the mobile station, slot assignment information notifying the mobile station of the at least one starting slot defined for the mobile station;
   (b) only monitoring at the mobile station, the defined at least one starting slot and the common starting slot in each round to determine if any one of the defined at least one starting slot and the common starting slot carries a data signal addressed to the mobile station; and
   (c) if any one of the defined at least one starting slot carries a data signal addressed to the mobile station, receiving at the mobile station the data signal of a variable length from one or more physically consecutive slots beginning with the one of the defined at least one starting slot.

18. A method according to claim 17, further comprising the step of putting the mobile station in a power saving mode and temporarily waking up the mobile station from the power saving mode when there comes the defined at least one starting slot assigned and the common starting slot to the mobile station.

19. A method according to claim 17, wherein after having received a data signal of a variable length contained in one or more physically consecutive slots, the mobile station monitors a slot immediately succeeding the one or more physically consecutive slots to receive any subsequent data signal addressed to the mobile station.

20. A method according to claim 17, wherein the mobile station, at the beginning of communication, monitors every slot in a round to detect a position of slot in which a synchronous word is present.

21. A method according to claim 17, wherein when waiting to receive a data signal, the mobile station can switch between a first mode where it only monitors the defined at least one starting slot and the common starting slot in each round and a second mode where it monitors every slot in each round, and a data signal of variable length is transmitted to the mobile station, using one or more physically consecutive slots beginning with one of the defined at least one starting slot if the mobile station operates under the first mode, or using one or more physically consecutive slots beginning with an arbitrary selected slot if the mobile station operates under said second mode.

22. A mobile station that receives a data signal of a variable length through a TDMA channel which is divided into recurring rounds of slots, wherein at least one starting slot is defined for the mobile station at the same slot position in every round, the mobile station comprising:

(a) a receiver that receives, using a common starting slot assigned commonly to a group of mobile stations including the mobile station, slot assignment information notifying the mobile station of the defined at least one starting slot and, if any one of the defined at least one starting slot carries a data signal addressed to the mobile station, receives the data signal of a variable length from one or more physically consecutive slots beginning with the one of the defined at least one starting slot; and (b) a control apparatus that only monitors the defined at least one starting slot and the common starting slot in each round to determine if any of the defined at least one starting slot and the common starting slot carries a data signal addressed to the mobile station.

23. A mobile station according to claim 22, further comprising a power consumption controller that puts the mobile station in a power saving mode and temporarily wakes up the mobile station from the, power saving mode when there come the defined at least one starting slot and the common starting slot to the mobile station.

24. A mobile station according to claim 22, wherein after having received a data signal of a variable length contained in one or more physically consecutive slots, the mobile station monitors a slot immediately succeeding the one or more physically consecutive slots to receive any subsequent data signal addressed to the mobile station.

25. A mobile station according to claim 22, wherein the mobile station, at the beginning of communication, monitors every slot in a round to detect a position of a slot in which a synchronous word is present.

26. A mobile station according to claim 22, wherein when waiting to receive a data signal, the mobile station can switch between a first mode where it only monitors the defined at least one starting slot and the common starting slot in each round and a second mode where it monitors every slot in each round, and a data signal of variable length is transmitted to the mobile station, using one or more physically consecutive slots beginning with the defined at least one starting slot if the mobile station operates under the first mode, or using one or more physically consecutive slots beginning with an arbitrary selected slot if the mobile station operates under said second mode.

* * * * *